(12) United States Patent
Manwaring et al.

(10) Patent No.: US 6,419,269 B1
(45) Date of Patent: Jul. 16, 2002

(54) LOCKING SYSTEM FOR ADJUSTABLE POSITION STEERING COLUMN

(75) Inventors: Marvin V. Manwaring, Saginaw, MI (US); Philippe Gayrard; Agathe Ledreau, both of Paris (FR); Kevin Carlton Ross, Hemlock, MI (US)

(73) Assignee: Delphi Technologies, Troy, MI (US)

( * ) Notice: Subject to any disclaimer, the term of this patent is extended or adjusted under 35 U.S.C. 154(b) by 0 days.

(21) Appl. No.: 09/664,032

(22) Filed: Sep. 18, 2000

Related U.S. Application Data

(60) Provisional application No. 60/154,772, filed on Sep. 20, 1999.

(51) Int. Cl.[7] .................................................. B62D 1/18
(52) U.S. Cl. ........................ 280/775; 280/777; 280/779; 74/493
(58) Field of Search .............................. 280/775, 777, 280/779; 74/493

(56) References Cited

U.S. PATENT DOCUMENTS

| | | | | |
|---|---|---|---|---|
| 5,029,489 A | * | 7/1991 | Burmeister et al. | 74/493 |
| 5,524,927 A | * | 6/1996 | Toussaint | 280/777 |
| 5,722,299 A | * | 3/1998 | Yamamoto et al. | 74/493 |
| 5,787,759 A | * | 8/1998 | Olgren | 74/493 |
| 5,820,163 A | * | 10/1998 | Thacker et al. | 280/775 |
| 6,068,295 A | * | 5/2000 | Skabrond et al. | 280/775 |
| 6,139,057 A | * | 10/2000 | Olgren et al. | 280/775 |

* cited by examiner

*Primary Examiner*—Brian L. Johnson
*Assistant Examiner*—Deanna Draper
(74) *Attorney, Agent, or Firm*—Edmund P. Anderson

(57) ABSTRACT

The vehicle steering column has a rake adjustment and a telescope adjustment. The adjustment mechanism includes a compression bracket with a telescope slot, a rake bracket with a rake slot and a rake bolt that passes through the telescope slot and the rake slot. A wedge lock is mounted on the rake bolt and positioned in the rake slot and the telescope slot. Rake and telescope teeth on the wedge lock are held out of engagement with a rake tooth rack and a telescope tooth rack during rake and telescope adjustment. The rake bolt is tightened to hold a selected adjustment position and the telescope teeth on the wedge lock engage the telescope tooth rack. During a collision the rake teeth on the wedge lock are moved into engagement with the rake tooth rack to fix the rake and telescope adjustments.

10 Claims, 4 Drawing Sheets

LOCKING SYSTEM FOR ADJUSTABLE POSITION STEERING COLUMN

CROSS-REFERENCE TO RELATED APPLICATIONS

This application claims the benefit of U.S. provisional patent application Ser. No. 60/154,772 filed Sep. 20, 1999, the entire contents of which are incorporated herein by reference.

FIELD OF THE INVENTION

This invention relates generally to lock systems for steering columns and more particularly to those which selectively lock the column against tilt or rake and telescoping movements in the event of a collision.

BACKGROUND OF THE INVENTION

Land vehicles manufactured today are frequently equipped with convenience features as well as safety features. The convenience features include steering columns with tilt adjustments, rake adjustments and telescope adjustments. These adjustments can be stepped adjustments or infinitely variable adjustments. The safety features include air bags and energy absorption devices. An air bag for a vehicle driver is generally mounted in the steering wheel. Energy absorption devices for drivers include mechanisms that permit a controlled collapse of the steering column.

Steering wheel mounted air bags are designed to deploy in the event of a collision to provide protection to the driver. It is desirable that the column remain fixed in the position of adjustment selected by the driver throughout the event of the collision to afford maximum performance and protection offered by the air bag. In addition to the airbag, adjustable position columns are typically fitted with energy absorption ("EA") systems, which may take the form of deformable energy absorbing straps or the like, that allow the column to collapse during a collision at a controlled rate when impacted by the driver to offer added protection to the driver. It is best that the column remain locked in the adjusted position and not slip to afford maximum performance of the EA system.

Steering columns with infinitely variable rake and telescope adjustments rely upon friction to maintain selected positions of adjustment. During normal operation and in a typical collision, the friction is generally sufficient to hold the adjustment systems against slippage. However, the frictional locking system does not provide a positive mechanical lock that would preclude movement of the adjustment parts under extreme conditions where the impact force on the column may be very high.

SUMMARY OF THE INVENTION

A locking system for an adjustable steering column according to the invention comprises at least one toothed rack and at least one associated toothed locking device movable selectively into engagement with the toothed rack. The locking device is normally supported out of engagement with the toothed rack to permit usual adjustment of the column, but is movable into meshing tooth-to-tooth locking engagement with the teeth of the rack in response to an applied impact force on the column by the driver during a collision event to positively lock the column against inadvertent adjustment during controlled collapse of the column.

According to a further aspect of the invention, the locking system is for a column having rake and telescoping adjustment features and includes a rack associated with the relatively movable telescoping adjustment components of the column and a rack associated with the relatively movable rake adjustment components of the column. Also included is a toothed locking device associated with the racks which is selectively movable into positive locking engagement in response to the applied impact load on the column to preclude both rake and telescoping movements of the column during the controlled collapse of the column in a collision event.

According to still a further aspect of the invention, the racks associated with the relatively movable rake and telescoping components are arrange adjacent one another and the locking device comprises a common locking element having teeth engagable with the teeth of both the rake and telescoping racks so as to simultaneously prevent both rake and telescoping movements when engaged.

According to still a further aspect of the invention, the set of rack teeth of the rake and telescoping racks are disposed at an acute angle and the teeth of the common locking element are likewise set at an acute angle such that the locking element is forced into wedged locking engagement with the racks to enhance the locking power of the locking system.

According to a preferred embodiment of the invention, the steering column includes a jacket assembly having a lower jacket and an upper jacket that telescopically receives the lower jacket. A telescopic steering shaft is journalled in the jacket assembly. A rake support on the lower end of the lower jacket pivotally supports the vehicle steering column for pivotal movement about a transverse horizontal rake axis. A compression bracket fixed to the upper jacket has at least one telescope slot. At least one rake bracket, for supporting the compression bracket has a rake slot. A rake bolt passes through the rake slot and the at least one telescope slot and is tightened to frictionally hold a rake position and a telescope position. A rake tooth rack in the rake slot faces away from the rake axis and extends upward and rearwardly away from the rake axis. A telescope tooth rack in the at least one telescope slot is substantially parallel to the steering shaft and faces upwardly. A wedge lock on the rake bolt has a plurality of telescope teeth engagable with the telescope tooth rack and has a plurality of rake teeth engagable with the rake tooth rack. A connection between the rake bolt and the wedge lock permits the wedge lock telescope teeth to move into engagement with the telescope tooth rack in response to rotation of the rake bolt in a direction that tightens the rake bolt.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
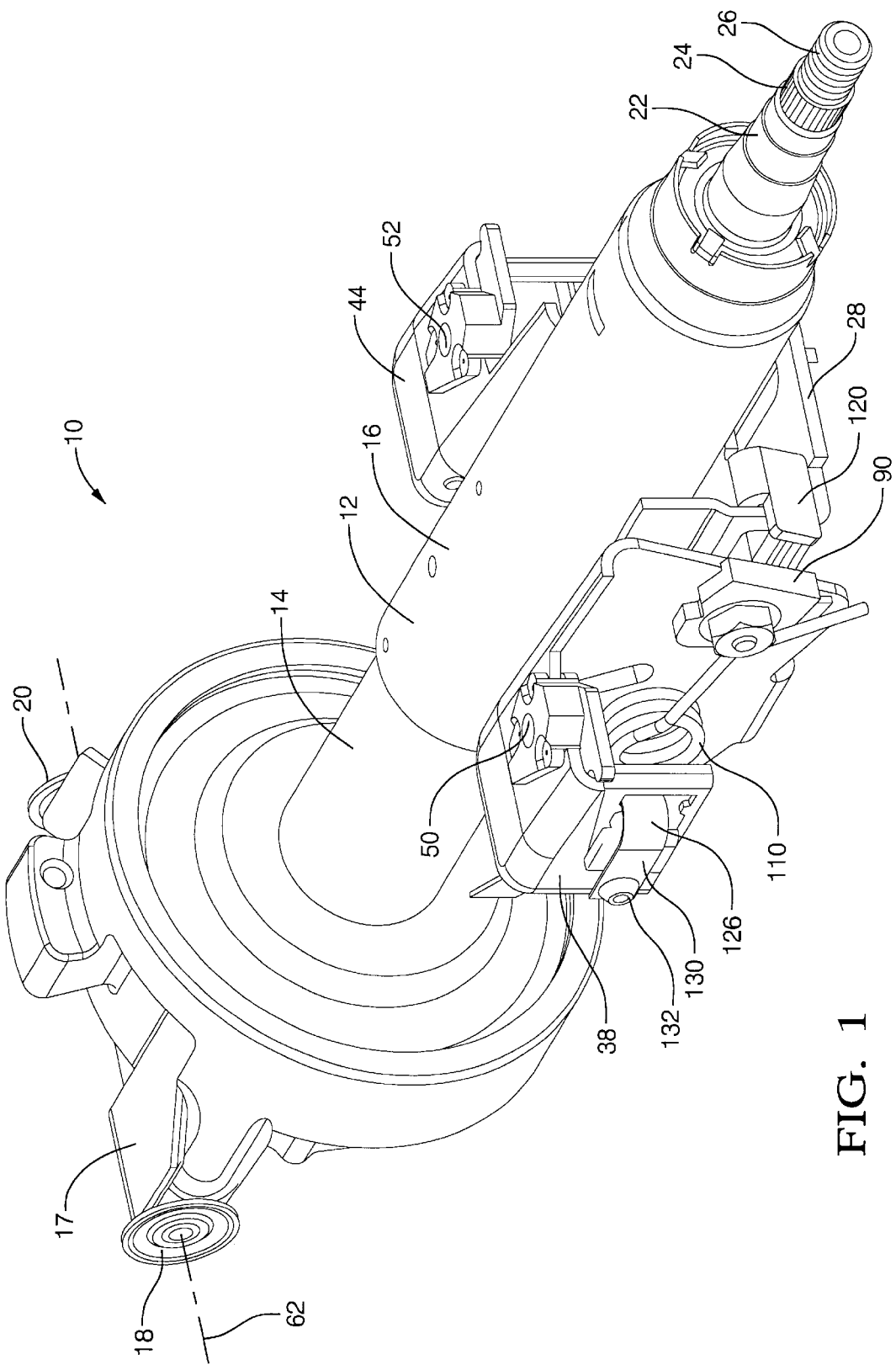
FIG. 1 is a perspective view of a steering column with rake and telescope adjustment and a wedge tooth lock.

The steering column 10, for an automotive vehicle, has a jacket assembly 12 with a lower jacket 14 and an upper jacket 16. The forward end of the lower jacket 14 has a rake support 17 with trunnions 18 and 20 that receive a pin which pivotally attaches the steering column 10 to a vehicle frame for pivotal movement about a transverse horizontal rake axis 62. The lower jacket 14 is telescopically received in the upper jacket 16. A steering shaft 22 is journalled in the jacket assembly 12. To accommodate telescopic movement of the upper jacket 16 relative to the lower jacket 14, the steering shaft 22 is also telescopic. A steering wheel (not shown) has splines which engage the splines 24 on the shaft 22. A nut engages the threads 26 to secure a steering wheel to the shaft 22.

A compression bracket 28 is welded to the upper jacket 16. Vertical side walls 30 and 32 have telescope slots 34 and 36. A left side rake bracket 38 has a vertical side wall 40 with a rake slot 42. A right side rake bracket 44 has a vertical side wall 46 with a rake slot 48. A left side rake bracket 38 is clamped to the vehicle body frame by a bolt (not shown) that passes through the anchor bolt passage 50. The right side rake bracket 44 is clamped to the vehicle body frame by a bolt (not shown) that passes through an anchor bolt passage 52, in a position spaced from the left side rake bracket 38. The compression bracket 28 is positioned between the side wall 40 of the left side rake bracket 38 and the side wall 46 of the right side rake bracket 44. A rake bolt 54 passes through the rake slot 42, the telescope slot 34, the telescope slot 36 and the rake slot 48. A triple lead rake nut 56 screws onto one end of the rake bolt 54. When the rake bolt 54 and the nut 56 are tightened, the compression bracket 28 is held in a fixed position by friction. By loosening the rake bolt 54 and nut 56, the friction forces on the compression bracket 28 are reduced and the rake and telescope positions can be changed to any position within the rake range and within the telescope range. When the steering wheel is in the desired position the rake bolt 54 and nut 56 are tightened to clamp the steering column 10 in the selected position.

Steering columns 10 are generally equipped with air bags and energy absorption devices to protect drivers in collisions. For these protective devices to work properly the rake positions and the telescope positions should remain substantially fixed during a collision. The friction forces that result from tightening the rake bolt 54 and nut 56 may be insufficient to hold the steering column 10 in the selected rake position and telescope position. A lock system that locks the telescope adjustment as well as the rake adjustment is described below.

The rake slots 42 and 48 have rake tooth racks 58 and 60 on their front edges. These rake tooth racks 58 and 60 extend upward and radially outward relative to the rake axis 62. The telescope slots 34 and 36 have telescope tooth racks 64 and 66 on their lower edge. A left wedge lock 68 is mounted on the rake bolt 54 and positioned in the rake slot 42 and the telescope slot 34. A right wedge lock 70 is mounted on the rake bolt 54 and positioned in the telescope slot 36 and the rake slot 48. The left wedge lock 68 has downwardly facing telescope teeth 72 and forwardly facing rake teeth 74. The right wedge lock 70 has downwardly facing telescope teeth 76 and forwardly facing rake teeth 78. A sleeve 80 on the rake bolt 54 maintains the required separation between the wedge locks 68 and 70.

A first rake bolt retainer 82 is secured to the nut 56 by a fastener 84. The retainer 82 has a lip 86 which slides on a surface 88 on the side wall 46, keeps the nut 56 from rotating, and holds the rake teeth 78 from engaging rake tooth rack 60 in the rake slot 48. A second rake bolt retainer 90 slides over a thrust bearing 92 and a washer 94 on the rake bolt 54. A lip 96 on the second rake bolt retainer 90 slides on a surface 98 on the side wall 40 and holds the rake teeth 74 on the left wedge lock 68 from engaging the rake tooth rack 58 in the rake slot 42.

Figure 4:
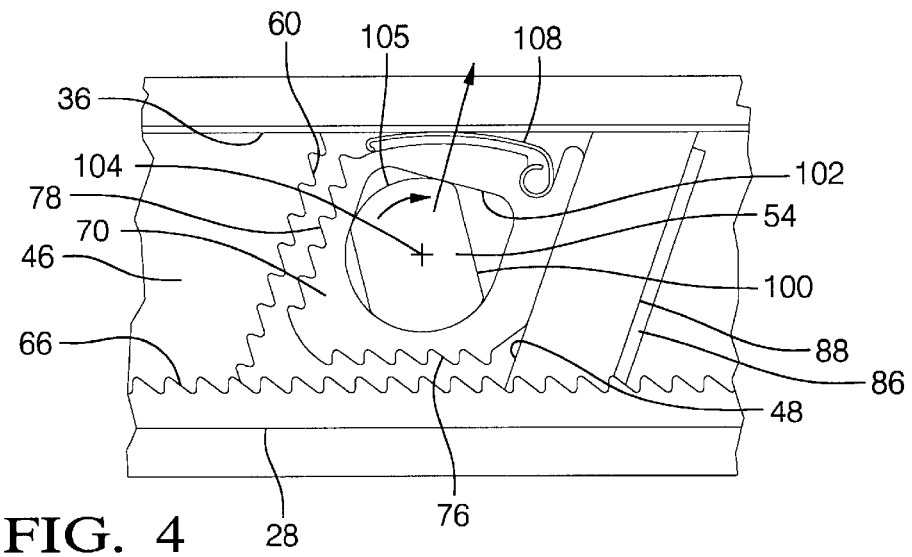
FIG. 4 is an enlarged sectional view of a rake bolt and a wedge lock in an unclamped position with parts broken away.
Figure 5:
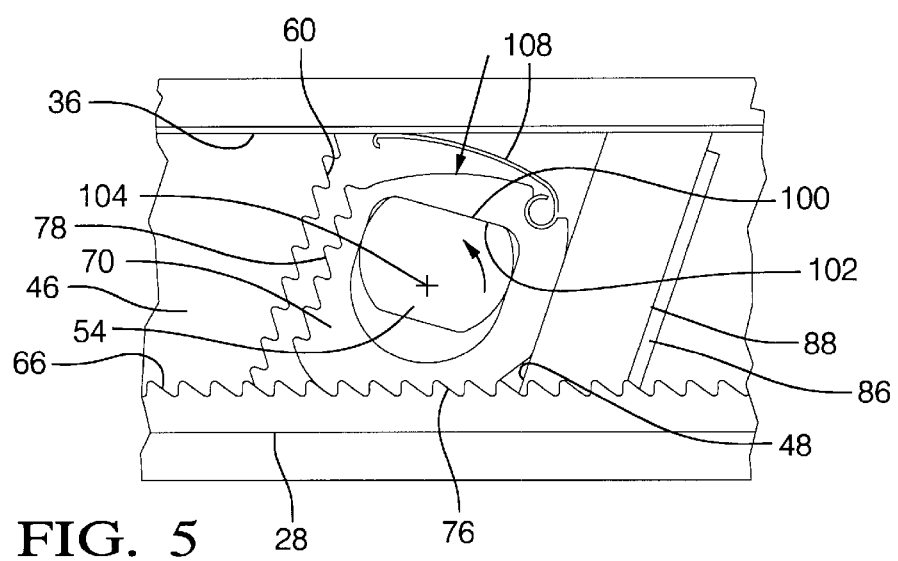
FIG. 5 is an enlarged sectional view of the rake bolt and a wedge lock in a clamped position with parts broken away.
Figure 6:
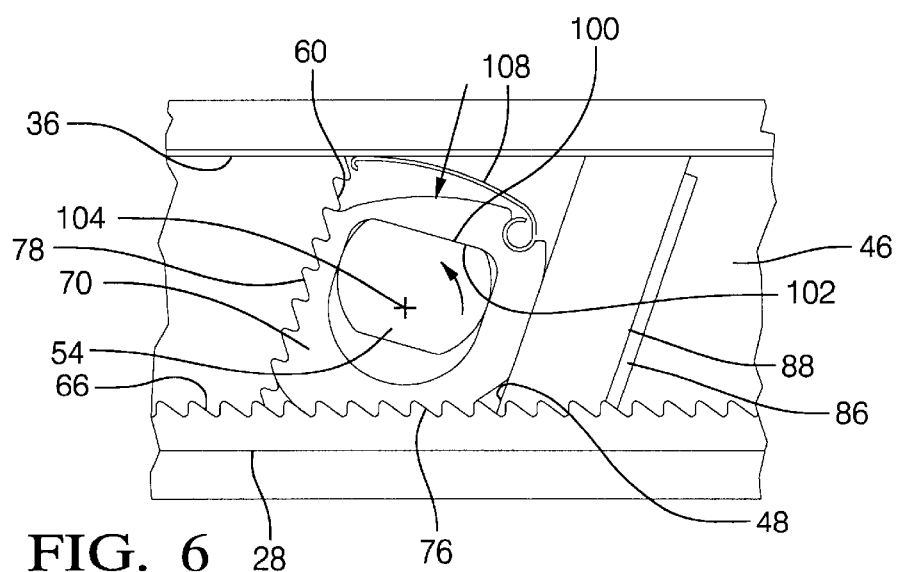
FIG. 6 is an enlarged sectional view of the rake bolt and a wedge lock in a locked position after the rake bolt retainer has fractured.

The rake bolt 54 has a flat surface 100 as shown in FIGS. 4–6. The wedge locks 68 and 70 also have a bore flat surface 102. The flat surface 100 on the bolt 54 and the bore flat surfaces 102 cooperate to form a lost motion connection as shown in FIG. 4. This lost motion connection permits the springs 106 and 108 to move the wedge locks 68 and 70 while the rake bolt remains stationary. When the rake bolt 54 is unlocked, the wedge locks 68 and 70 are raised relative to the rake bolt axis of rotation 104 and the telescope teeth 72 and 76 on the wedge locks 68 and 70 are out of engagement with a telescope tooth racks 64 and 66. When the rake bolt is rotated to a locked position as shown in FIG. 5, the flat surface on the rake bolt 54 is moved into radial alignment with the bore flat surface 102 in the wedge locks 68 and 70. This frees the wedge locks 68 and 70 to move downward. Spring fingers 106 and 108 mounted on the wedge locks 68 and 70 ensure that the telescope teeth 72 and 76 move into engagement with the telescope tooth racks 64 and 66. In this position, a forward force on the steering column 10 which is sufficient to overcome the friction forces between the rake brackets 38 and 44 and the compression bracket 28 and fracture the rake bolt retainers 82 and 90 and move the rake teeth 74 and 78 on the wedge locks 68 and 70 into engagement with the rack tooth racks 58 and 60 in the rake slots 42 and 48. In this position, the wedge locks 68 and 70 prevent movement between the rake brackets 38 and 44 and the compression bracket 28. Total movement between the rake brackets 38 and 44 and the compression bracket 28 during a collision is substantially less than one quarter of an inch.-Cancel The coil springs 110 and 111 have arms 112 and 114 that contact the rake bolt retainers 82 and 90 and urge them upward. Coil springs 110 and 111 also have short arms 116 and 118 that are anchored to the rake brackets 38 and 44. The purpose of the coil springs 116 and 118 is support the steering column jacket assembly 12 when the rake bolt 54 is loosened and keep the steering wheel from falling on a person. Since the coil springs 110 and 111 act on the rake bolt retainers 82 and 90 as well as the rake bolt 54, they move the telescope teeth 72 and 76 out of engagement with the tooth racks 64 and 66 when the rake bolt is loosened for steering column adjustment.

The compression bracket 28 includes a stop arm 120 which contacts the rake bolt retainer 90 to limit rearward telescopic adjustment of the upper jacket 16 of the jacket assembly 12.

The left side rake bracket 38 and the right side rake bracket 44 include breakaway capsules 122 and 124. These breakaway capsules 122 and 124 remain attached to the vehicle body frame and the remainder of the rake brackets 38 and 44 separate from the capsules upon the application if a predetermined force to the jacket assembly 12. The predetermined force may occur during a collision. After separation of the rake brackets 38 and 44 from the breakaway capsules 122 and 124, energy absorption straps 126 and 128 control forward movement of the upper jacket 16. An anchor end 130 of each strap 126 and 128 is clamped to the adjacent rake bracket 38 or 44 by a fastener 131. The free end of each of the energy absorption strips 126 and 128 passes through an energy absorption strap retainer 132 or 134. The strap retainers 132 and 134 are secured to the breakaway capsules 122 and 124 respectively. As the straps 126 and 128 pass through the strap retainers 132 or 134 they are bent into an arc and then restraightened to absorb energy.

The lips 86 and 96 on the first and second rake bolt retainers 82 and 90 hold the rake teeth 74 and the rake teeth 78 out of engagement with the rake tooth racks 58 and 60 during normal operation and use of the steering column 10. There is no physical guide that holds the rake bolt 54 adjacent to the upper side of the telescope slots 34 and 36. The coil springs 110 and 111, as explained above, exert a force on the rake bolt 54, through the first and second rake bolt retainers 82 and 90 that generally position the rake bolt adjacent to the upper side of the telescope slots 34 and 36.

A cam 140 is provided to ensure that the rake bolt 54 is positioned relative to the telescope tooth racks 64 and 65. The cam 140 is integral with the sleeve 80 which rotates with the rake bolt 54. The rake bolt 54 as shown in FIGS. 4, 5 and 6 has a noncircular cross section. The sleeve 80 has an internal passage with a shape that is substantially the same as the shape of the rake bolt 54 and prevents rotation of the sleeve 80 relative to the rake bolt. Rotation of the rake bolt 54 clockwise, as shown in FIG. 4 to loosen the rake bolt, rotates the lobe 142 into contact with the bottom wall 144 of the compression bracket 28 and forces the rake bolt 54, left wedge lock 68 and the right wedge lock 70 away from the telescope tooth racks 64 and 66. In this position the wedge locks 68 and 70 do not interfere with telescopic adjustment of the steering column 10. Rotation of the rake bolt 54 counterclockwise, as shown in FIG. 5 to tighten the rake bolt, moves the lobe 146 of the cam 140 into contact with the upper transverse wall 148 of the compression bracket 28 and moves the rake bolt toward the telescope tooth racks 64 and 66. In this position the telescope teeth 72 and 76 on the wedge locks 68 and 70 can move into engagement with the telescope tooth racks 64 and 66 as intended.

During operation of the steering column 10, the rake bolt 54 is loosened and cammed away from the telescope tooth racks 64 and 66 by the cam 140. The telescope position and rake position are then adjusted. Following adjustment of the steering wheel and the steering shaft 22, the rake bolt 54 is tightened. Tightening the rake bolt 54 causes the lobe 146 of the cam 140 to move the rake bolt toward the telescope tooth racks 64 and 66, frees the wedge locks 68 and 70 to move relative to the rake bolt, and compresses the compression bracket 28 between the left and right side rake brackets 38 and 44. The spring fingers 106 and 108 on the wedge locks 68 and 70 move the telescope teeth 72 and 76 into engagement with the telescope tooth racks 64 and 66. Frictional forces between the left side rake bracket 38, the compression bracket 28 and the right side rake bracket 44 maintain the chosen rake and telescope adjustments.

Figure 2:
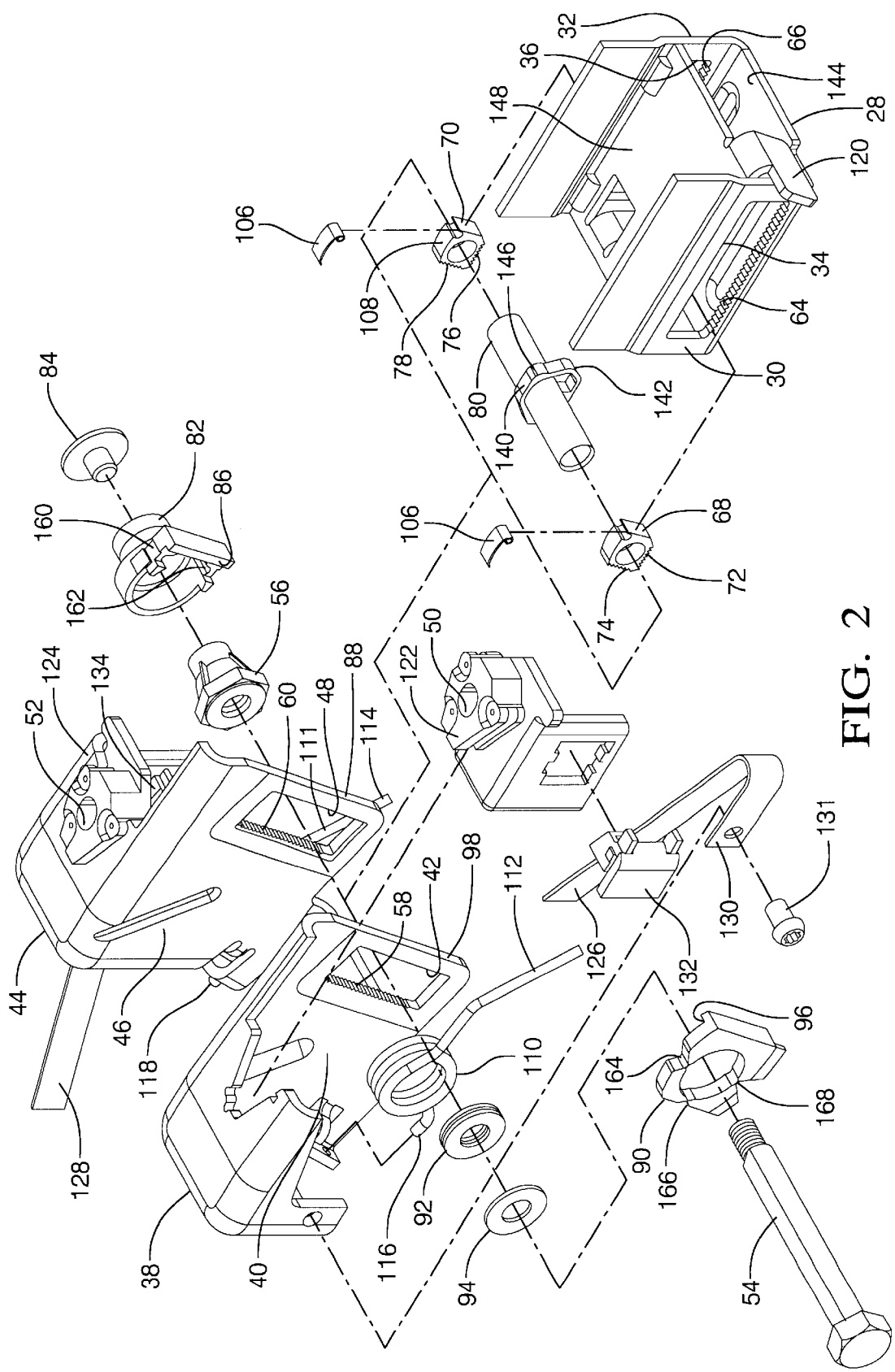
FIG. 2 is an expanded view of the rake and telescope adjustment assemblies and the wedge tooth lock.
Figure 3:
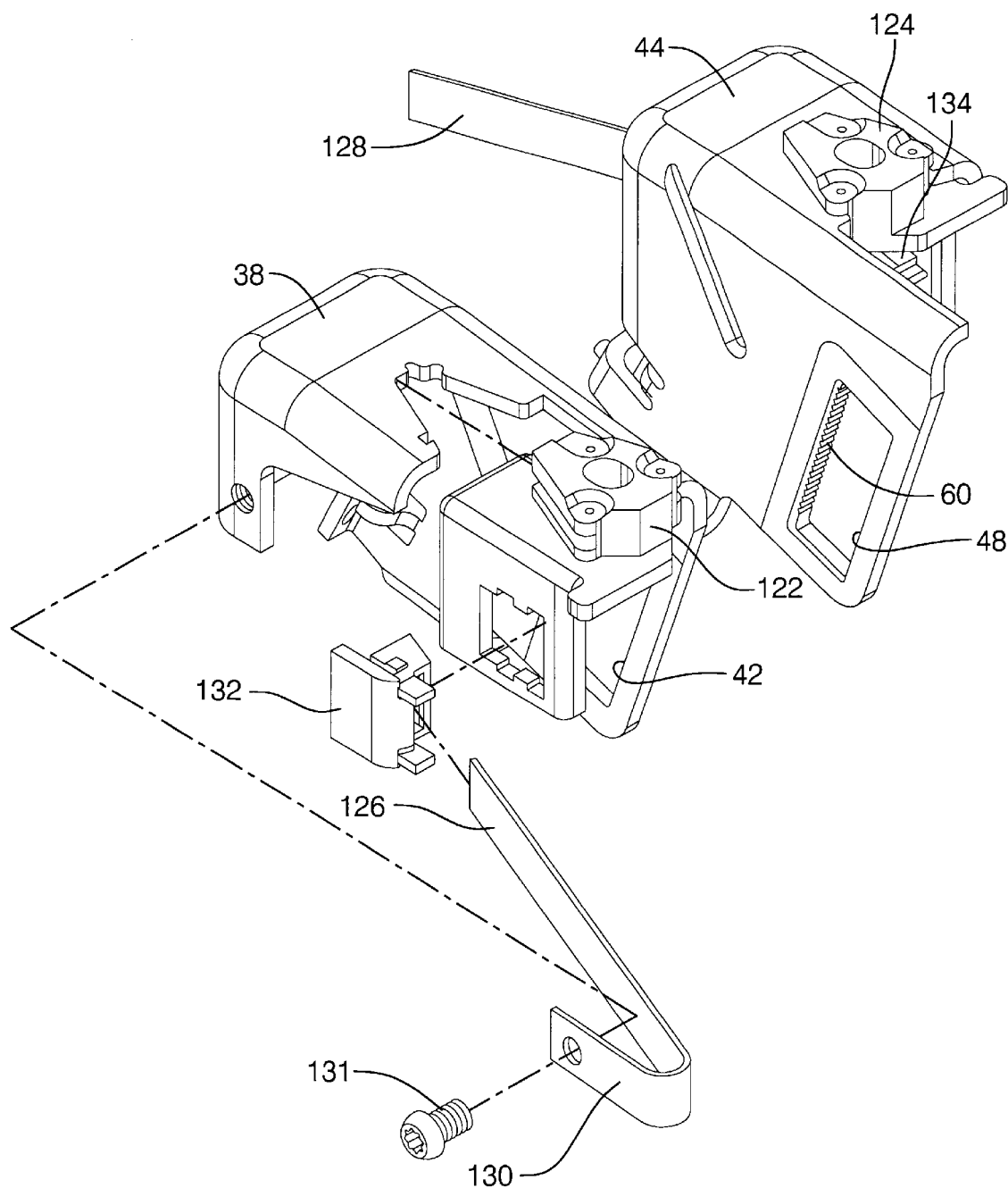
FIG. 3 is a perspective view of the rake brackets with the left side rake bracket expanded and the right side rake bracket assembled.

A collision between a vehicle with the steering column 10 and a large or fast moving object will slow the vehicle and the driver will move forward toward the steering wheel. Force exerted on the steering wheel by the driver will tend to move the steering wheel forward. This force may also tend to move the steering wheel upward. The force on the steering wheel, if sufficiently strong, will first overcome the frictional forces on the compression bracket 28 and slide the compression bracket forward relative to the left and right side rake brackets 38 and 44. The engagement of the telescope tooth racks 64 and 66 with the telescope teeth 72 and 74 moves the left and right wedge locks 68 and 70 forward with the compression bracket 28. This forward movement of the wedge locks 68 and 70 and the rake bolt 54 fractures the first and second rake bolt retainers 82 and 90 and moves the rake teeth 74 and 78 into engagement with the rake tooth racks 58 and 60. The first rake bolt retainer 82 fractures in at least one of the weakened areas 160 and 162 shown in FIG. 2. The second rake bolt retainer 90 fractures in at least one of the weakened areas 164, 166 or 168. Up to this point total movement of the steering shaft 22 is less than ¼ of an inch.

An increased forward force on the steering shaft 22 will separate the left and right side rake bracket 38 and 44 from the breakaway capsules 122 and 124. Upon separation between the rake brackets 38 and 44 and the breakaway capsules 122 and 124, the energy absorption straps 126 and 128 will resist forward movement of the steering shaft 22 and absorb energy.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A vehicle steering column comprising:
   a jacket assembly including a lower jacket and an upper jacket that telescopically receives the lower jacket;
   a telescopic steering shaft journalled in the jacket assembly;
   a rake support on the lower end of the lower jacket that pivotally supports the vehicle steering column for pivotal movement about a transverse horizontal rake axis;
   a compression bracket fixed to the upper jacket and having at least one telescope slot;
   at least one rake bracket, for supporting the compression bracket and the upper jacket having a rake slot;
   a rake bolt passing through the rake slot and the at least one telescope slot that is tightened to frictionally hold a rake position and a telescope position;
   a rake tooth rack in the rake slot that faces rearwardly;
   a telescope tooth rack in the at least one telescope slot that is substantially parallel to the steering shaft and faces upwardly;
   a wedge lock on the rake bolt having a plurality of telescope teeth engagable with the telescope tooth rack and having a plurality of rake teeth engagable with the rake tooth rack; and
   a connection between the rake bolt and the wedge lock that permits the telescope teeth to move into engagement with the telescope tooth rack in response to rotation of the rake bolt to tighten the rake bolt.

2. A vehicle steering column as set forth in claim 1 including a cam surface on the rake bolt that cams the telescope teeth out of engagement with the telescope tooth rack in response to rotation of the rake bolt to loosen the rake bolt.

3. A vehicle steering column as set forth in claim 1 wherein the connection between the rake bolt and the wedge lock is a lost motion connection.

4. A vehicle steering column as set forth in claim 3 including a spring that biases the plurality of telescope teeth on the wedge lock toward the telescope tooth rack.

5. A vehicle steering column as set forth in claim 4 wherein the spring is attached to the wedge lock and acts on the compression bracket.

6. A vehicle steering column as set forth in claim 1 wherein the at least one rake bracket includes a left rake bracket and a right rake bracket having a left rake slot and a right rake slot and a second wedge lock on the rake bolt.

7. A vehicle steering column comprising:
- a jacket assembly including a lower jacket and an upper jacket that telescopically receives the lower jacket;
- a telescopic steering shaft journalled in the jacket assembly;
- a rake support on the lower end of the lower jacket that pivotally supports the vehicle steering column for pivotal movement about a transverse horizontal rake axis;
- a compression bracket fixed to the upper jacket and having a left telescope slot and a right telescope slot;
- a left rake bracket having a left rake slot adjacent to the left telescope slot of the compression bracket and a right rake bracket having a right rake slot adjacent to the right telescope slot of the compression bracket;
- a rake bolt passing through the left rake slot, the left telescope slot, the right telescope slot, and the right rake slot;
- a left rake tooth rack in the left rake slot that faces away from the rake axis and extends upward and rearwardly away from the rake axis;
- a right rake tooth rack in the right rake slot that faces away from the rake axis and extends upward and radially away from the rake axis;
- a left telescope tooth rack in the left telescope slot that faces upwardly and a right telescope tooth rack in the right telescope slot that faces upwardly;
- a left wedge lock on the rake bolt having a plurality of left telescope teeth engagable with the left telescope tooth rack and a plurality of left rake teeth engagable with the left rake tooth rack;
- a right wedge lock on the rake bolt having a plurality of right telescope teeth engagable with the right telescope tooth rack and a plurality of right rake teeth engagable with the right rake tooth rack;
- a first fracturable rake bolt retainer mounted on the rake bolt and holding the right rake teeth from engagement with the right rake tooth rack during adjustment and a second fracturable rake bolt retainer mounted on the rake bolt and holding the left rake teeth from engagement with the left rake tooth rack during adjustment; and
- at least one cam secured to the rake bolt which holds the left telescope teeth out of engagement with the left telescope rack and holds the right telescope teeth out of engagement with the right telescope rack when the rake bolt is loosened.

8. A vehicle steering column as set forth in claim 7 including a lost motion connection between the rake bolt and the left wedge lock and right wedge lock that permits the left telescope teeth to engage the left telescope tooth rack and permits the right telescope teeth to engage the right telescope tooth rack when the rack bolt is in a clamped position.

9. A vehicle steering column as set forth in claim 8 including a left spring that urges the left wedge lock toward the left telescope tooth rack and a right spring that urges the right wedge lock toward the right telescope tooth rack.

10. A method of operating a vehicle steering column having a rake adjustment and a telescope adjustment with a rake bracket, a rake slot in the rake bracket, a rake tooth rack on a rake slot side wall, a compression bracket, a telescope slot in the compression bracket, a telescope tooth rack on a telescope slot side wall, a wedge lock with a plurality of telescope teeth and a plurality of rake teeth, and a rake bolt passing through the rake slot and the telescope slot and holding the wedge lock in the rake slot and in the telescope slot comprising:
- loosening the rake bolt and holding the plurality of telescope teeth out of engagement with the telescope tooth rack and holding the plurality of rake teeth out of engagement with the rake tooth rack;
- selecting a telescope position and a rake position of the vehicle steering column;
- tightening the rake bolt to frictionally hold the selected telescope position and rake position;
- moving the plurality of telescope teeth into engagement with the telescope tooth rack when the rake bolt is tightened while holding the plurality of rake teeth out of engagement with the rake tooth rack;
- sliding the compression bracket relative to the rake bracket while the rake bolt is tightened; and
- moving the plurality of rake teeth into engagement with the rake tooth rack while sliding the compression bracket relative to the rake bracket.

* * * * *